United States Patent
Self et al.

(10) Patent No.: US 10,282,217 B2
(45) Date of Patent: May 7, 2019

(54) METHOD, SYSTEM AND COMPUTER PROGRAM PRODUCT FOR OBJECT SERIALIZATION AND DE-SERIALIZATION

(71) Applicant: Change Healthcare Holdings, LLC, Nashville, TN (US)

(72) Inventors: Bryan Self, Birmingham, AL (US); Elizabeth Fox, Birmingham, AL (US); Joshua Turner, HueyTown, AL (US)

(73) Assignee: CHANGE HEALTHCARE HOLDINGS, LLC, Nashville, TN (US)

( * ) Notice: Subject to any disclaimer, the term of this patent is extended or adjusted under 35 U.S.C. 154(b) by 0 days.

(21) Appl. No.: 15/647,424

(22) Filed: Jul. 12, 2017

(65) Prior Publication Data

US 2019/0018691 A1    Jan. 17, 2019

(51) Int. Cl.
  *G06F 8/71* (2018.01)
  *G06F 9/46* (2006.01)
  *G06F 16/22* (2019.01)
  *G06F 9/448* (2018.01)

(52) U.S. Cl.
  CPC ............ *G06F 9/4493* (2018.02); *G06F 9/465* (2013.01); *G06F 8/71* (2013.01); *G06F 16/2246* (2019.01)

(58) Field of Classification Search
  CPC .......... G06F 8/71; G06F 9/4493; G06F 9/465; G06F 16/2246
  USPC .................................................. 717/114–119
  See application file for complete search history.

(56) References Cited

U.S. PATENT DOCUMENTS

| | | | | |
|---|---|---|---|---|
| 6,301,585 | B1 * | 10/2001 | Milne | G06F 8/30 |
| 7,814,124 | B1 * | 10/2010 | de Jong | G06F 9/4493 |
| | | | | 707/798 |
| 2004/0244012 | A1 * | 12/2004 | Massarenti | G06F 9/4493 |
| | | | | 719/319 |
| 2006/0123046 | A1 * | 6/2006 | Doise | G06F 8/437 |
| 2006/0218538 | A1 * | 9/2006 | van Kesteren | G06F 9/4493 |
| | | | | 717/137 |
| 2013/0117326 | A1 * | 5/2013 | De Smet | G06F 9/4488 |
| | | | | 707/798 |
| 2015/0142854 | A1 * | 5/2015 | Seth | G06F 17/30342 |
| | | | | 707/798 |

OTHER PUBLICATIONS

SoftwareArtist, Read and Write JSON with Python, 2015, gowrishankarnath.com (Year: 2015).*

* cited by examiner

*Primary Examiner* — Qing Chen
(74) *Attorney, Agent, or Firm* — Alston & Bird LLP

(57) ABSTRACT

A method, apparatus and computer program product are provided for serializing and de-serializing objects such that data may be transmitted between disparate systems otherwise having incompatible object definitions. The disparate systems may include different versions of the same system or completely different systems. Object graphs may be recursively broken down into primitive components, and the data may be reformatted as maps of primitive data chained together. The data may be transmitted to a disparate recipient system and reassembled into objects recognizable by the disparate recipient system. Various systems can then communicate with each other regardless of underlying data formats.

18 Claims, 5 Drawing Sheets

METHOD, SYSTEM AND COMPUTER PROGRAM PRODUCT FOR OBJECT SERIALIZATION AND DE-SERIALIZATION

TECHNOLOGICAL FIELD

Embodiments of the present invention relate generally to computer technology and, more particularly, to methods, apparatuses, and computer program products for serializing and de-serializing objects.

BACKGROUND

Many web-based systems rely on $3^{rd}$ party services and communications to deliver full functionality and reliable data to its users. In many environments, disparate systems may utilize the same or similar underlying data in their communication with each other. However, the applications operative on the systems may use different object definitions and/or data structures to organize and access the data. This presents a problem in transmitting data between systems whose data interfaces do not perfectly match.

Even in systems utilizing the same software applications, some systems receive upgrades as newer versions of the software are developed. In some cases, a system having a different version of software than another may need to transmit data to and from the other system, or to utilize functionality of the other system that requires data integration. In many cases, an object definition or other data structure differs between the two versions of software, and the two systems may be unable to share data and communicate as intended. Without compatible data interfaces, an attempt by either system to communicate with the other may result in system crashes, server timeouts, and/or the like.

BRIEF SUMMARY

Methods, apparatuses, and computer program products are therefore provided for serializing and de-serializing objects. As mentioned above, disparate systems may be unable to communicate when their object definitions do not match. As one example, when Java programming code is used to transmit data between systems, the systems may be unable to communicate if the particular object types are not implemented on one system, or different versions include different fields within any of the utilized objects. Some programming languages, such as Java, includes serialization and de-serialization functions. However, due to its limitations, Java does not handle situations in which the data from one system does not exactly match the format utilized by the other system.

Example embodiments provided herein provide a way for disparate systems, including different versions of the same system or completely different systems, to successfully transmit data between systems, regardless of any difference in data format. The method, apparatus, and computer program product provided herein therefore provide a solution to the above described problem such that the data is reformatted to be compatible between disparate systems. According to example embodiments, the reformatted data may be shared even when the object definitions do not match.

Example embodiments may be at least partially implemented with a computer programming language such as Java and/or Groovy, which is a superset of Java. While Java uses a proprietary binary serialization method that requires that the objects be exactly the same in each system, example embodiments use an object graph comprised of maps. Example embodiments break down the object graphs into primitive components using maps chained together, and then reassemble the data so that it can be received by any disparate system, such as another Java-based system. It will be appreciated that Java and Groovy are mentioned as non-limiting example computer programming languages that may be utilized in implementing example embodiments, but that any programming language may be used to implement embodiments described herein.

According to example embodiments, a method is provided for receiving an object graph comprising a plurality of objects, serializing the object graph to generate a map tree comprising a plurality of maps, wherein each map comprises dyads of first and second elements, wherein dyads representing primitive fields are populated as (name, value) pairs and dyads representing non-primitive fields are populated as (name, map) pairs, causing transmission of the map tree to a disparate system, and de-serializing the map tree to populate a second plurality of objects compatible with the disparate system.

In some embodiments, each map comprises a class-specifying dyad of a predefined string and a class identifier to identify the class which the respective map represents.

According to some embodiments, serializing a particular map of the map tree comprises identifying a class-specifying dyad having a first element matching the predefined string. Serializing further includes, in an instance the second element of the class-specifying dyad matches a class available to the disparate system, creating an object of a type specified by the class identifier and continuing de-serialization of the particular map, and in an instance the second element of the class-specifying dyad does not match any class available to the disparate system, discontinuing de-serialization of the particular map.

In some embodiments, continuing the de-serialization of the particular map includes recursively processing each dyad of the particular map until the particular map processed comprises only the class-specifying dyad and (name, value) pairs representing primitive fields. recursively processing each dyad of the particular map may include determining whether a field matching the first element of a particular dyad exists in an associated class of the disparate system, in an instance the field matching the first element of the particular dyad exists in the associated class of the disparate system, processing the second element of the particular dyad, and in an instance the field matching the first element of the particular dyad does not exist in the associated class of the disparate system, preventing processing of the second element of the particular dyad.

A system is also provided. The system may include a first apparatus comprising at least one processor and at least one memory including computer program code, the at least one memory and the computer program code configured to, with the processor, cause the first apparatus to at least receive an object graph comprising a plurality of objects, serialize the object graph to generate a map tree comprising a plurality of maps, wherein each map comprises dyads of first and second elements, wherein dyads representing primitive fields are populated as (name, value) pairs and dyads representing non-primitive fields are populated as (name, map) pairs, and cause transmission of the map tree to a second apparatus.

The system may further include the second apparatus, wherein the second apparatus is configured by at least a second processor to cause the second apparatus to at least de-serialize the map tree to populate a second plurality of objects compatible with the second apparatus.

A computer program product is also provided, including at least one non-transitory computer-readable storage medium having computer-executable program code instructions stored therein, the computer-executable program code instructions comprising program code instructions to, receive an object graph comprising a plurality of objects, serialize the object graph to generate a map tree comprising a plurality of maps, wherein each map comprises dyads of first and second elements, wherein dyads representing primitive fields are populated as (name, value) pairs and dyads representing non-primitive fields are populated as (name, map) pairs, cause transmission of the map tree to a disparate system, and de-serialize the map tree to populate a second plurality of objects compatible with the disparate system.

An alternative or additional computer program product is also provided, the computer program product comprising at least one non-transitory computer-readable storage medium having computer-executable program code instructions stored therein, the computer-executable program code instructions comprising program code instructions to receive an object graph comprising a plurality of objects, and serialize the object graph to generate a map tree comprising a plurality of maps, wherein each map comprises dyads of first and second elements, wherein dyads representing primitive fields are populated as (name, value) pairs and dyads representing non-primitive fields are populated as (name, map) pair. The computer-executable program code instructions may further comprise program code instructions to cause transmission of the map tree to a disparate system to enable de-serialization of the map tree and population of a second plurality of objects compatible with the disparate system.

An apparatus is also provided, with means for receiving an object graph comprising a plurality of objects, means for serializing the object graph to generate a map tree comprising a plurality of maps, wherein each map comprises dyads of first and second elements, wherein dyads representing primitive fields are populated as (name, value) pairs and dyads representing non-primitive fields are populated as (name, map) pairs, means for causing transmission of the map tree to a disparate system, and means for de-serializing the map tree to populate a second plurality of objects compatible with the disparate system.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
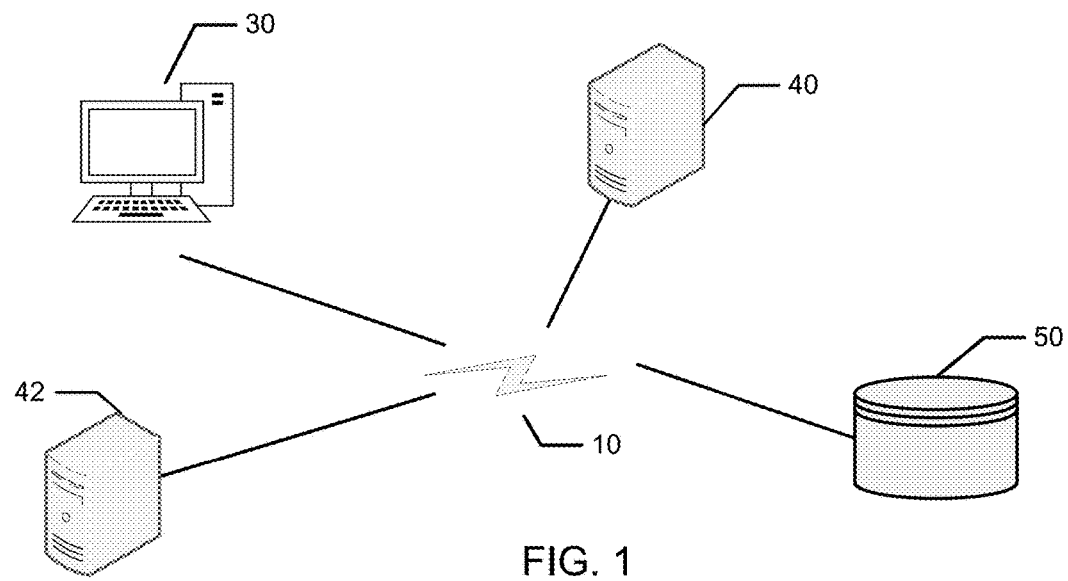
Figure 2:
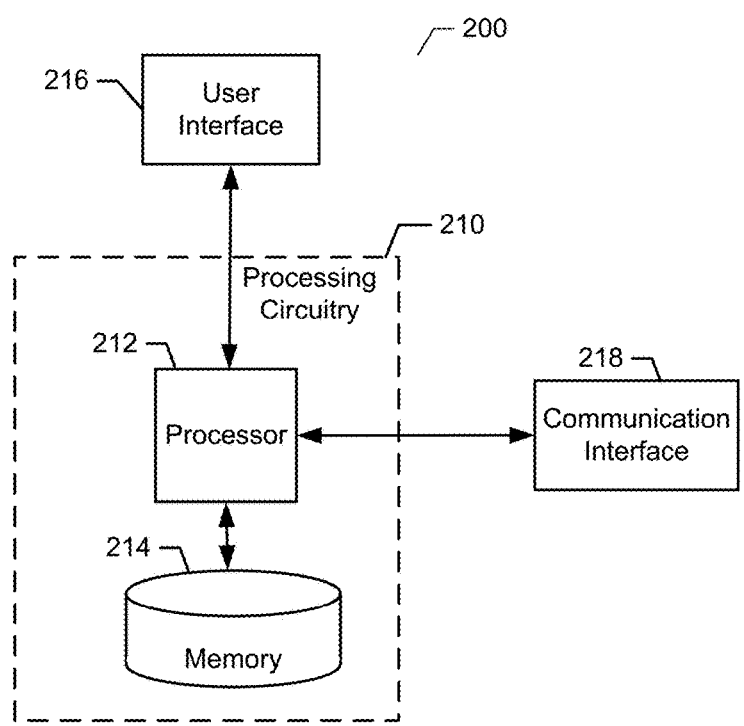
Figure 3:
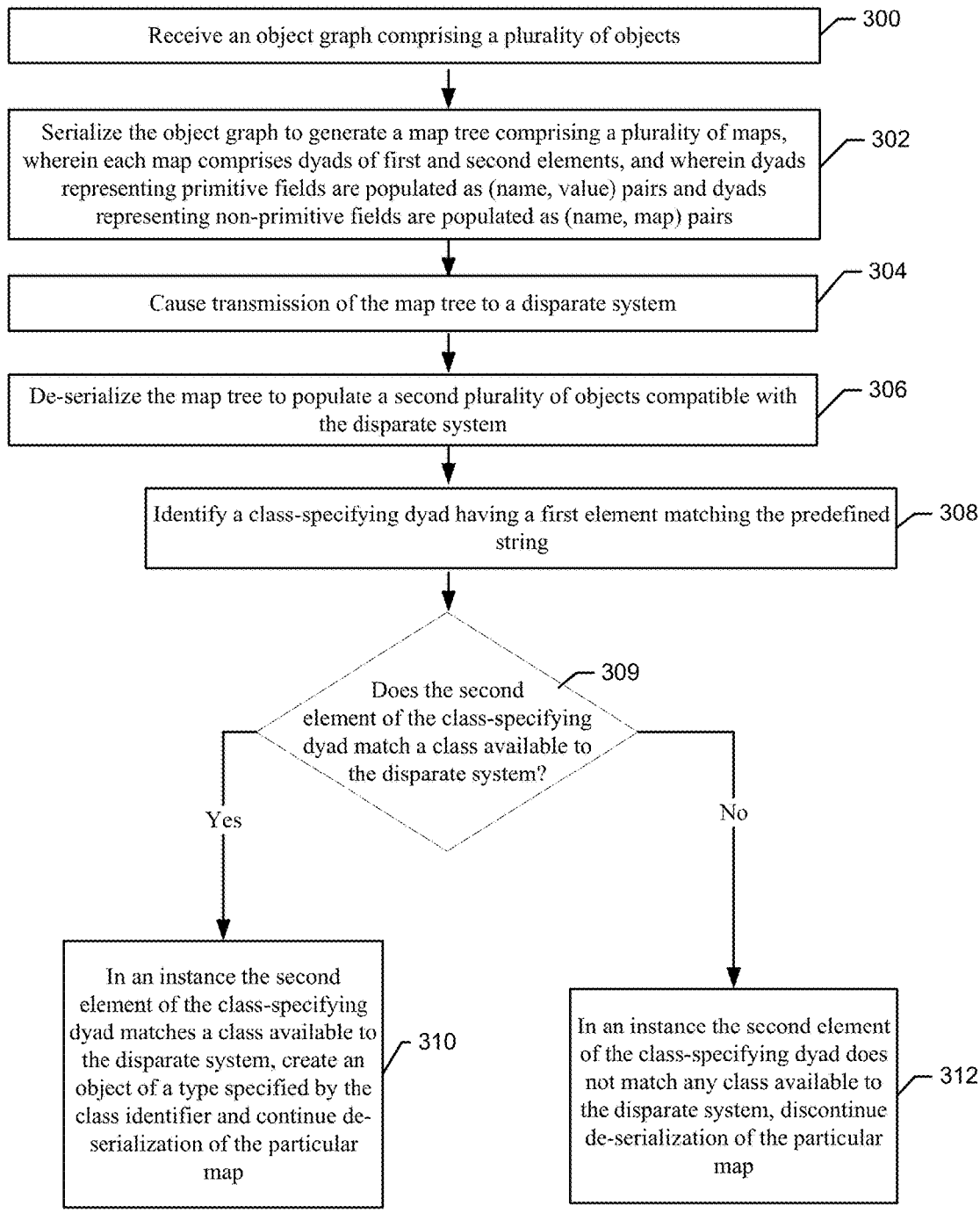
Figure 4:
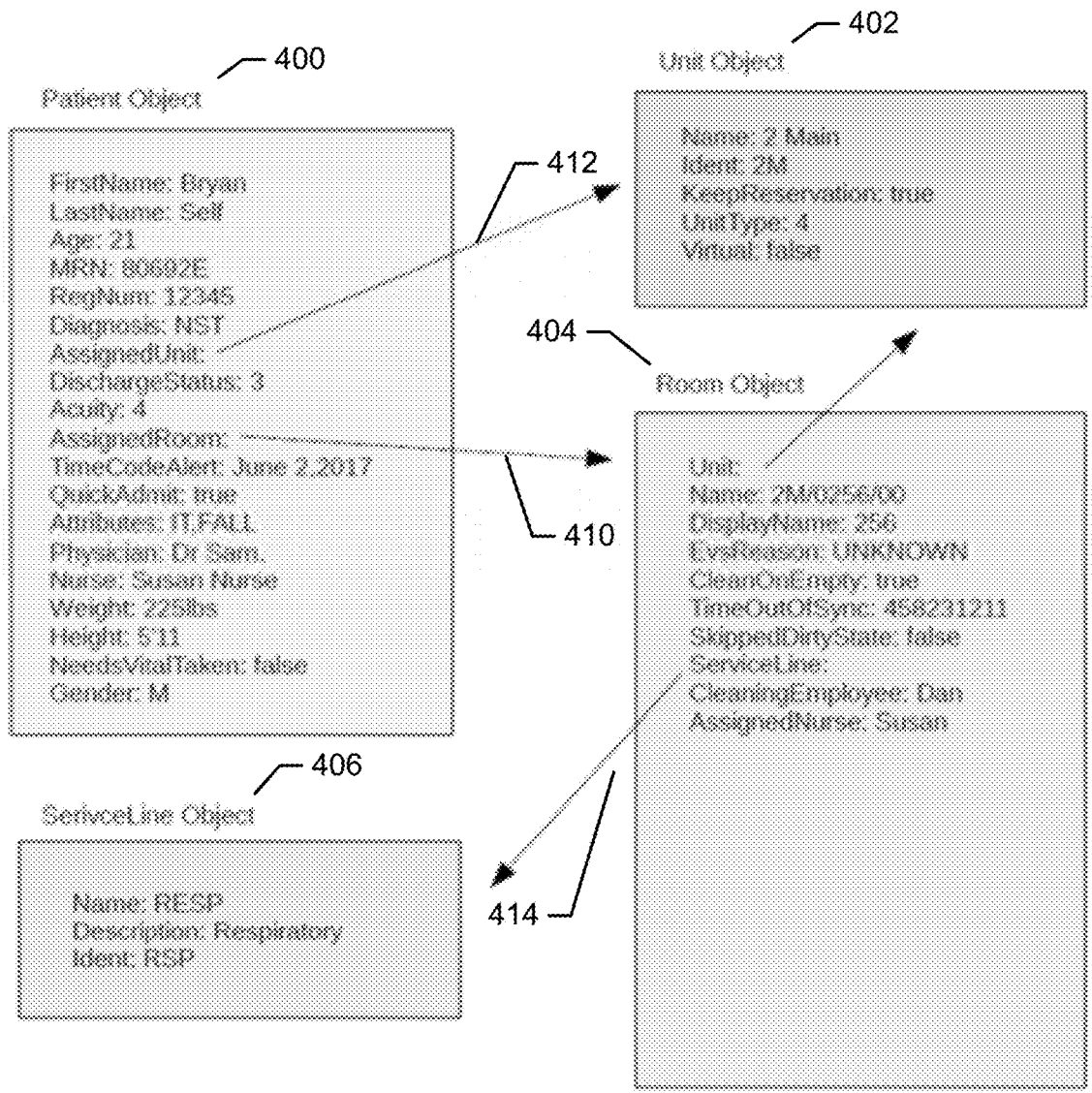
Figure 5:
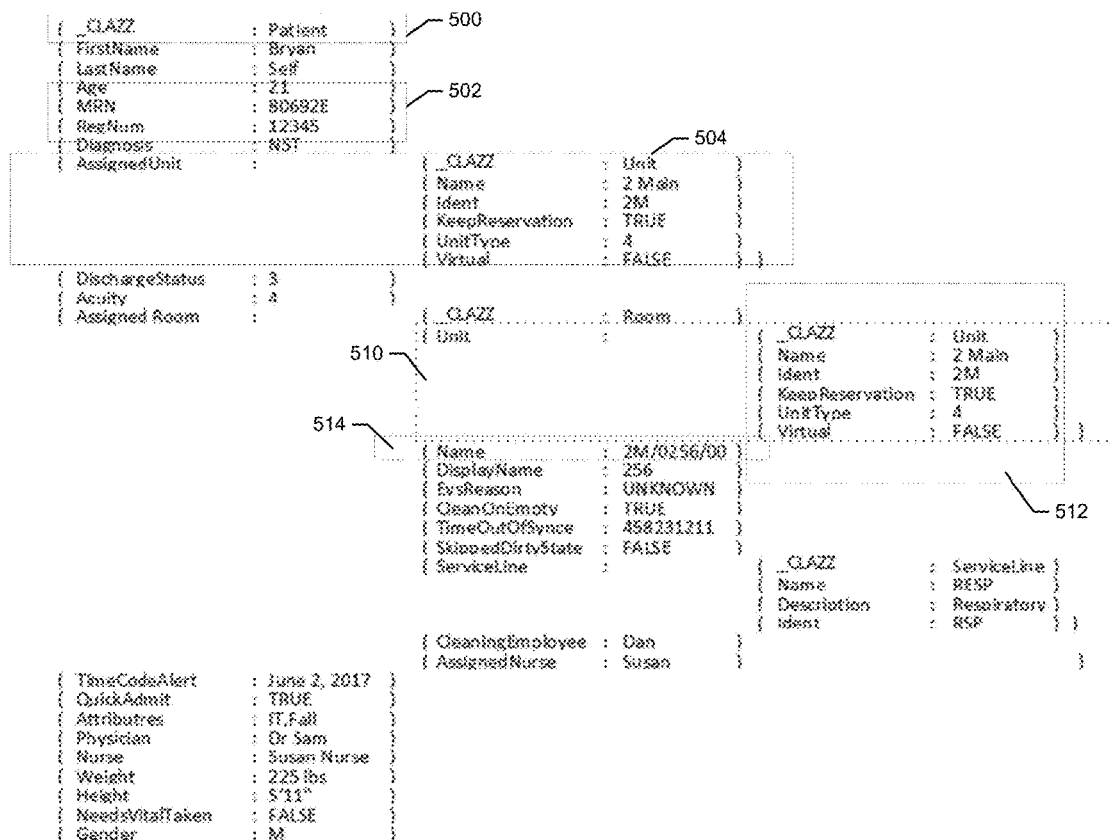
Figure 6:
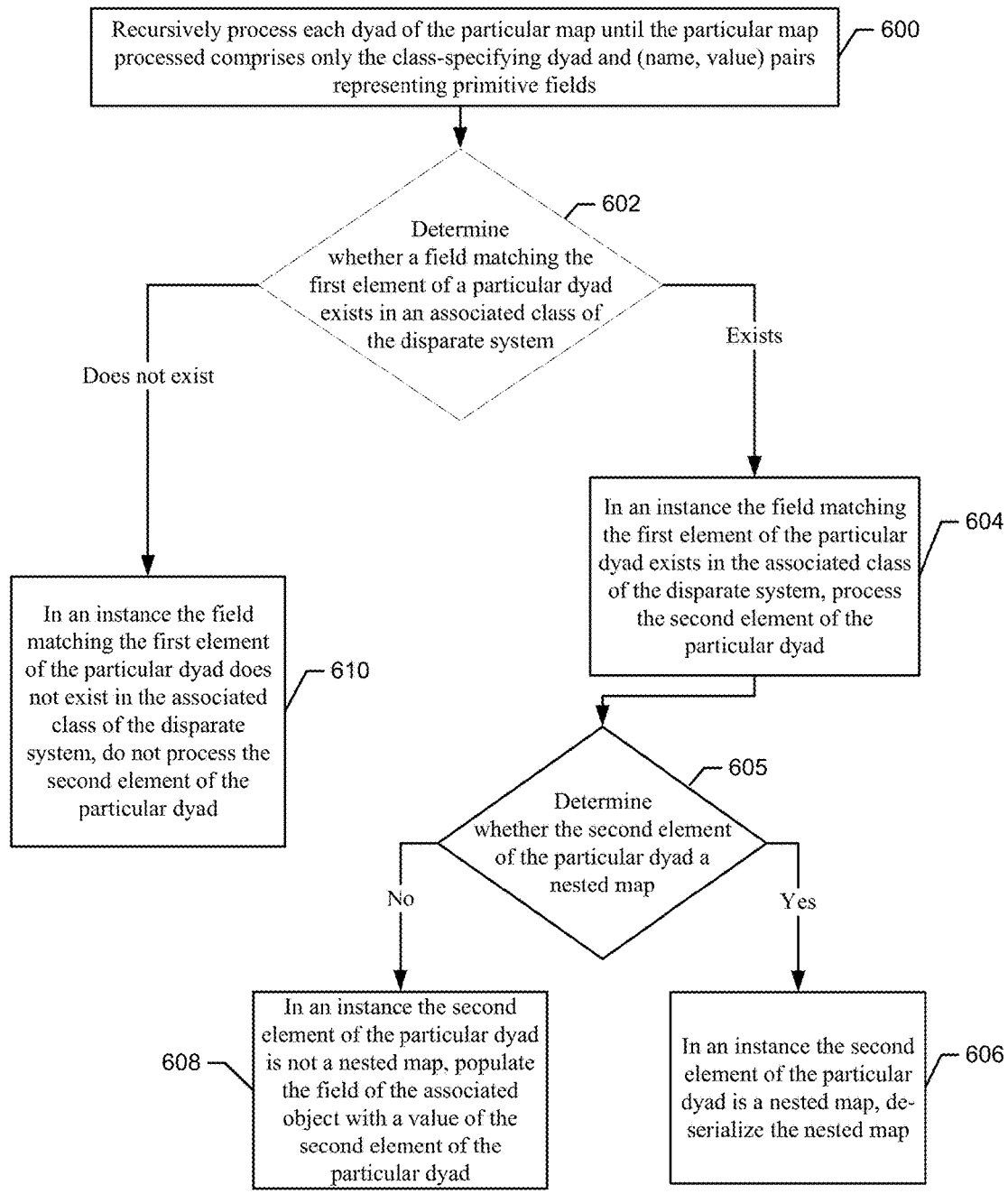

Having thus described embodiments of the invention in general terms, reference will now be made to the accompanying drawings, which are not necessarily drawn to scale, and wherein:

FIG. 1 is an overview of a system that can be used to practice some example embodiments described herein;

FIG. 2 is an exemplary schematic diagram of an apparatus in accordance with some example embodiments;

FIG. 3 is a flowchart of operations that may be performed in accordance with some example embodiments;

FIG. 4 is an illustration of an example object graph according to some example embodiments;

FIG. 5 is an illustration of an example map tree according to some example embodiments; and FIG. 6 is a flowchart of operations that may be performed in accordance with some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described herein to receive data from another computing device, it will be appreciated that the data may be received directly from the other computing device and/or may be received indirectly via one or more intermediary computing devices, such as, for example, one or more servers, relays, routers, network access points, and/or the like. Similarly, where a computing device is described herein to transmit data to another computing device, it will be appreciated that the data may be sent directly to the other computing device or may be sent to the other computing device via one or more interlinking computing devices, such as, for example, one or more servers, relays, routers, network access points, and/or the like.

FIG. 1 is an overview of a system that can be used to practice certain embodiments described herein, and should not be considered limiting. As illustrated in FIG. 1, example embodiments may be implemented as or employed in a distributed system. The various depicted components may be configured to communicate over a network 10, such as the Internet, for example, or any other communication interface as described in further detail hereinafter. In general, systems 40 and 42 may include any systems, servers, and/or like computing device configured to communicate over network 10. The facilitation of their communication is described herein according to example embodiments. In some examples, any number of user devices 30 may be configured to communicate with systems 40, 42. The systems 40 and/or 42 may be communicatively connected to any number of database(s) 50 which may be configured to store data, content, and/or the like.

The systems 40 and 42 are provided as example disparate systems which may employ example embodiments to communicate data with one another, regardless of format. Systems 40 may therefore both be a different version of system 42, or may comprise differing versioned systems. In some examples, systems 40 and 42 may be different systems configured to exchange data. Regardless of implementation, disparate systems 40 and/or 42 may include or reference at least one subset of data that is in a different format, or not known to the other of the systems.

The system of FIG. 1 described above is provided merely as an example implementation and it will be appreciated that the example embodiments provided herein may be implemented as or employed by any number of system architectures.

Referring now to FIG. 2, apparatus 200 is a computing device(s) configured for providing serialization and de-serialization of data communicated between systems 40 and 42. Apparatus 200 may at least partially or wholly embody any of the system 40 and/or system 42, described above. Apparatus 200 may implement any of the user device 30, system 40, system 42, and/or database 50, in accordance with some example embodiments, or may be implemented as or include a distributed system that includes any of the network 10, user device 30, system 40, system 42, and/or database 50. In some examples, apparatus 200 may be implemented separately from any of the components of FIG. 1 (such as on a separate server or system), but may nevertheless be configured to facilitate communication between systems 40 and 42 as described herein.

It should be noted that the components, devices, and elements illustrated in and described with respect to FIG. 2 below may not be mandatory and thus some may be omitted in certain embodiments. For example, FIG. 2 illustrates a user interface 216, as described in more detail below, which may be optional in the systems 40 and 42 and/or database 50. Additionally, some embodiments may include further or different components, devices, or elements beyond those illustrated in and described with respect to FIG. 2.

Continuing with FIG. 2, processing circuitry 210 may be configured to perform actions in accordance with one or more example embodiments disclosed herein. In this regard, the processing circuitry 210 may be configured to perform and/or control performance of one or more functionalities of apparatus 200 in accordance with various example embodiments. The processing circuitry 210 may be configured to perform data processing, application execution, and/or other processing and management services according to one or more example embodiments. In some embodiments apparatus 200, or a portion(s) or component(s) thereof, such as the processing circuitry 210, may be embodied as or comprise a circuit chip. The circuit chip may constitute means for performing one or more operations for providing the functionalities described herein.

In some example embodiments, the processing circuitry 210 may include a processor 212, and in some embodiments, such as that illustrated in FIG. 2, may further include memory 214. The processing circuitry 210 may be in communication with or otherwise control a user interface 216, and/or a communication interface 218. As such, the processing circuitry 210 may be embodied as a circuit chip (e.g., an integrated circuit chip) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of apparatus 200 as described herein. The plurality of processors may be embodied on a single computing device or distributed across a plurality of computing devices collectively configured to function as user device 30, system 40, system 42, database 50, and/or apparatus 200. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices. The memory 214 may be configured to store information, data, applications, computer program code, instructions and/or the like for enabling apparatus 200 to carry out various functions in accordance with one or more example embodiments.

The memory 214 may be configured to buffer input data for processing by the processor 212. Additionally or alternatively, the memory 214 may be configured to store instructions for execution by the processor 212. In some embodiments, the memory 214 may include one or more databases, such as database 50, that may store a variety of files, contents, or data sets. Among the contents of the memory 214, applications may be stored for execution by the processor 212 to carry out the functionality associated with each respective application. In some cases, the memory 214 may be in communication with one or more of the processor 212, user interface 216, and/or communication interface 218, for passing information among components of apparatus 200.

The optional user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a joystick, a display, a touch screen display, a microphone, a speaker, and/or other input/output mechanisms. In some example embodiments in which apparatus 200 is embodied as system 40, system 42, database 50, and/or the like, aspects of user interface 216 may be limited or the user interface 216 may not be present.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable communication amongst user device 30, system 40, system 42, database 50, and/or apparatus 200 over a network. Accordingly, the communication interface 218 may, for example, include supporting hardware and/or software for enabling wireless and/or wireline communications via cable, digital subscriber line (DSL), universal serial bus (USB), Ethernet, or other methods.

The network, such as network 10, in which apparatus 200 and/or any of the components described herein may operate (e.g., user device 30, server 40, database 50, or apparatus 200, and/or the like) may include a local area network, the Internet, any other form of a network, or in any combination thereof, including proprietary private and semi-private networks and public networks. The network may comprise a wired network and/or a wireless network (e.g., a cellular network, wireless local area network, wireless wide area network, some combination thereof, and/or the like).

FIG. 3 is a flowchart illustrating example operations of an apparatus 200 according to some example embodiments. The operations of FIG. 3 may be performed by apparatus 200 to facilitate communication between systems 40 and 42. The following disclosure will be described with respect to the non-limiting example of patient data in an electronic health record. However, it will be appreciated that example embodiments may be utilized to facilitate communication of different types of data, such as but not limited to financial data, calendar data, or any other type of records data.

As shown by operation 300, apparatus 200 may include means, such as processing circuitry 210, processor 212, memory 214, communication interface 218, and/or the like, for receiving an object graph comprising a plurality of objects. An object graph may be considered any type of machine readable data structure that may be processed by a programming language. For example, the object graph may include a plurality of objects such as those defined by a Java programming language, other object oriented language, and/or the like. The object graph may be readable by system 40 and may be transmitted to apparatus 200 to be reformatted and transmitted to system 42.

FIG. 4 illustrates an example object group comprising 4 objects of type Patient (400), Unit (402), Room (404) and Service Line (406). The Patient object 400 includes numerous primitive fields (e.g., FirstName, LastName, Age, etc.) and also a reference (410) to an instance of a Room object, and a reference (412) to an instance of a Unit object. The Room object includes a reference (414) to an instance of a ServiceLine object. An object graph received by the apparatus 200 may include any number of objects that comprise any number of fields.

In some examples, apparatus 200 may also include means, such as processing circuitry 210, processor 212, memory 214, communication interface 218, and/or the like, for receiving a list of one or more peers (e.g., systems) to which data represented by the plurality of objects is to be transmitted. The systems may include a disparate system from system 40, such as system 42.

In operation 302, apparatus 200 may include means, such as processing circuitry 210, processor 212, memory 214, and/or the like, for serializing the object graph to generate a map tree comprising a plurality of maps, wherein each map comprises dyads of first and second elements, and dyads representing primitive fields are populated as (name, value) pairs and dyads representing non-primitive fields are populated as (name, map) pairs. Populating the (name, map) pairs includes serializing a nested map or sub-map, and in this regard, the serialization of the object graph is a recursive operation. The population of the fields is described in further detail below with reference to example pseudocode and the example map tree of FIG. 5.

In addition to the primitive fields populated as (name, value) pairs, and the non-primitive fields populated as (name, map) pairs, in some embodiments, each map may comprise a class-specifying dyad of a predefined string and a class identifier to identify the class which the respective map represents (e.g., a (pre-defined string, class-identifier) pair). For example, the first element of the class-specifying dyad may be a string represented by the variable _CLAZZ, which may represent a pre-defined string "_clazz." Any predefined string may be used, and may be selected as a string that is not used as a field name in any of the object definitions on any of the interfacing systems such as systems 40 and 42. In some embodiments, a variable need not necessarily be used and the predefined string may be the predefined string (e.g., "_clazz") itself. In this regard, example embodiments may distinguish the class-specifying dyad from other dyads in a map which represent fields of the represented object.

The second element of the class-specifying dyad may be a class identifier used to identify the class which the respective map represented. As an example, the class identifier may be the canonical name of the class. Example embodiments may access the canonical name of the class by using functionality provided by programming languages (e.g., getCanonicalName( )), such as but not limited to Java and/or Groovy, for example. The class identifier may additionally or alternatively comprise any other data enabling example embodiments to identify the class which the particular map represents.

Table 1 illustrates example pseudocode for recursively generating a map tree representing the object graph.

TABLE 1

| | |
|---|---|
| 1.1 | convert object to map { |
| 1.2 | create map |
| 1.3 | populate class-identifying dyad in map with (predefined string, object class name) |
| 1.4 | recursively traverse the object graph to populate values and sub-maps: recurse(map,object)  } |

Table 2 illustrates example pseudocode for implementing the recursive function "recurse" referenced in Table 1.

TABLE 2

| | |
|---|---|
| 2.1 | recurse (map,object) { |
| 2.2 | traverse each field of the object |
| 2.3 | if field is primitive, populate (name, value) of field in map |
| 2.4 | if field is non-primitive (e.g., another object), recurse (new submap, field) } |

FIG. 5 provides an example illustration of a map tree representing the object tree of FIG. 4 according to example embodiments. The spacing and arrangement of elements in FIG. 5 are provided for improved visual interpretation of the map tree, but it will be appreciated that any specifications relating to spacing and/or arrangement are not necessarily included in the data generated by example embodiments.

As shown by indicator 500, the dyad of (_CLAZZ, Patient) is the class-specifying dyad for the patient object 400. At indicator 502, several (name, value) pairs representing the primitive type fields in the patient object 400 are also provided. At indicator 502, a pair (field, map) representing the non-primitive field of Assigned Unit is provided. A sub-map or nested map representing an instance of the Unit object is provided.

A map tree may comprise any number of maps linked together, and may comprise fields of only strings, or may comprise fields of only primitive type (e.g., strings, integers, etc.). The map tree may therefore be readable and interpretable by other systems, regardless of the versions of applications operative on the other systems. For example, every element in the map tree of FIG. 5 is primitive data that can be represented as a mere string, or dyads of strings. Memory 214 (e.g., on system 40 and/or system 42) is therefore transformed to store the primitive data elements. Example embodiments change the format in which the data is stored so that the data can be processed by a recipient disparate system, regardless of the version of application software operative on the recipient disparate system. For example, a system having a different version of an application, and/or a different version of the objects represented by the map tree may still receive and process data from the map tree as described in further detail below. The map tree may be stored on memory 214 and transmitted to another system as described below.

Returning to FIG. 3, in operation 304, apparatus 200 may include means, such as processing circuitry 210, processor 212, memory 214, communication interface 218, and/or the like, for causing transmission of the map tree to a disparate system, such as a second system 42. The disparate system or system 42 may receive the map tree and process the map tree with computing programming code provided according to example embodiments described below. Accordingly, in operation 306, apparatus 200 may include means, such as processor 212, memory 214, communication interface 218, and/or the like, for de-serializing the map tree to populate a second plurality of objects compatible with the disparate system. The de-serialization is described in further detail in operations 308, 309, 310 and 312.

In operation 308, apparatus 200 may include means, such as processing circuitry 210, processor 212, memory 214, and/or the like, for recursively processing the map tree by traversing each dyad of a map, and in an instance the first element of a dyad matches the predefined string, determining whether the associated class identifier matches a class available to the disparate system.

In operation 309, apparatus 200 may include means, such as processing circuitry 210, processor 212, memory 214, and/or the like, for determining whether the second element of the class-specifying dyad matches a class available to the disparate system.

In operation 310, apparatus 200 may include means, such as processing circuitry 210, processor 212, memory 214, and/or the like, for in an instance the second element of the class-specifying dyad matches a class available to the disparate system, creating an object of a type specified by the class identifier and continuing de-serialization of the particular map. Further detail and example operations for continuing de-serialization of a map are provided in further detail in FIG. 6.

In operation 312, apparatus 200 may include means, such as processing circuitry 210, processor 212, memory 214, and/or the like, for in an instance the second element of the class-specifying dyad does not match any class available to the disparate system, discontinuing de-serialization of the particular map. In this regard, the particular object may not be known to the disparate system, so example embodiments may not process, prevent the processing of, or ignore the represented object as the disparate system has no compatible object to be populated. Accordingly, any further nested sub-maps in the particular map would not be de-serialized.

FIG. 6 is a flowchart of operations for continuing de-serialization of a particular map (e.g., see operation 310 of FIG. 3). The operations of FIG. 6 may be performed after processing the class-specifying dyad and instantiating an object recognizable by the disparate system.

In operation 600, apparatus 200 may include means, such as processing circuitry 210, processor 212, memory 214, and/or the like, for recursively processing each dyad of the particular map until the particular map processed comprises only the class-specifying dyad and (name, value) pairs representing primitive fields. The recursive processing is described in further detail below with regard to the remaining operations of FIG. 6 described below.

In operation 602, apparatus 200 may include means, such as processing circuitry 210, processor 212, memory 214, and/or the like, for determining whether a field matching the first element of the particular dyad exists in an associated class of the disparate system. For example, some programming languages, such as Java and/or Groovy include a function for returning the corresponding field, such as getField (fieldname). If the response is not null, it can be determined the field exists in the class of the disparate system. If the response is null, the field does not exist in the class on the disparate system.

In operation 604, apparatus 200 may include means, such as processing circuitry 210, processor 212, memory 214, and/or the like, for in an instance the field matching the first element of the particular dyad exists in the associated class of the disparate system, processing the second element of the particular dyad. Processing the second element of the particular dyad is described in further detail in operations 605, 606 and 608.

In operation 605, apparatus 200 may include means, such as processing circuitry 210, processor 212, memory 214, and/or the like, for determining whether the second element of the particular dyad is a nested map.

In operation 606, apparatus 200 may include means, such as processing circuitry 210, processor 212, memory 214, and/or the like, for in an instance the second element of the particular dyad is a nested map, de-serializing the nested map. The nested map or sub-map may be processed according to the flowchart of FIG. 6, thereby providing the recursive property set forth in operation 600. For example, the second element of dyad 510 is map 512, which may be recursively processed and de-serialized.

In operation 608, apparatus 200 may include means, such as processing circuitry 210, processor 212, memory 214, and/or the like, for in an instance the second element of the particular dyad is not a nested map, populating the field of the associated object with a value of the second element of the particular dyad. Therefore, for each (name, value) pair of map 512, the corresponding field is populated in the corresponding object, if the field indeed exists in the object definition known to the disparate system (see, e.g., operation 604).

In operation 610, apparatus 200 may include means, such as processing circuitry 210, processor 212, memory 214, and/or the like, for in an instance the field matching the first element of the particular dyad does not exist in the associated class of the disparate system, ignoring, preventing the processing of, or not processing the second element of the particular dyad. In this regard, the object definition known to the disparate system (e.g., system 42) may be a different version than the object definition known to system 40 from which the map tree was generated. In such an in instance, the second element is ignored, not processed, and not populated in the object, because there is no appropriate field to be populated.

Because map 512 comprises only the class-specifying dyad, and (name, value) pairs representing primitive fields (e.g., no further nested maps or sub-maps are present in the map), when each dyad of the map 512 has been processed, a recursive cycle of the recursive function set forth by operation 600 may be considered complete, and example embodiments may continue to process the next dyad (e.g., dyad 514) of a parent map in which the particular sub-map (e.g., map 512) is contained.

Table 3 provides example pseudocode that may be used to de-serialize a map, or to convert a map to an object, such as but not limited to a Java object.

TABLE 3

| | |
|---|---|
| 3.1 | convert map to object ( ) |
| 3.2 | if class identified by class-specifying dyad exists, instantiate new object |
| 3.3 | traverse each dyad other than the class-specifying dyad |
| 3.4 |    if first element of dyad field exists in object |
| 3.5 |       if second element is sub-map, recursively convert the sub-map to object |
| 3.6 |       if second element is a primitive value, populate the field of the object |

Example embodiments described herein provide many technical advantages and benefits to systems 40 and/or 42. Example embodiments allow for different versions of the same system to pass data back and forth, regardless of the data format. For example, an application version 1.0 can pass data to an application version 2.0 and application version 2.0 can pass data to an application version 1.0 without incurring system crashes or timeouts.

For example, consider that application 1.0 needs to send patient data to application 2.0, which is a more recent version of application 1.0. In the time since application 1.0 was developed, a new patient weight field has been added to the patient object in application 2.0. The patient object in application 1.0 does not contain the patient weight field.

Without the benefit of the disclosed example embodiments, because the patient object from application 1.0 does not match the patient object in application 2.0, application 2.0 cannot receive the patient data without serializing and de-serializing the data as described herein. Without the benefit of the example embodiments, a system would attempt to unpack or access data in the weight field, which does not exist in application 1.0, resulting in a fatal error.

However, according to the example embodiments provided herein the patient data may be reformatted so that application 2.0 can receive the data from application 1.0. This enables the two versions to share data, even though the objects do not match.

Example embodiments may also allow different applications to pass data back and forth, regardless of the data format. Example embodiments therefore provide a transformation of memory (e.g., memory 214 of system 40 and/or 42) such that disparate systems 40 and 42 can transmit and interpret particular types of data from each other, that otherwise may not be interpretable by a recipient disparate system.

As another example, example embodiments may enable an application or system to transmit patient data between hospitals or other practices. Example embodiments may therefore enable hospitals or other practices to request beds and create bed reservations across hospitals within the network despite running different versions of the same application. Example embodiments may be implemented within at least two disparate systems (e.g., operative with at least two respective hospital networks), but may be provided from, and/or may be under the control of a single entity, such as a healthcare support entity. The healthcare support entity may therefore enable and provide communication between the two hospital entities according to example embodiments. Some embodiments may be implemented on a single computing entity such as a server of the healthcare support entity (e.g., disparate system 40), such that the objects compatible with the disparate system may be populated by the single computing entity for transmittal to an external disparate system (e.g., disparate system 42). As another example, embodiments may be implemented within a system such that a first disparate system 40 (e.g., computing entity or network) is operated independently and/or under separate ownership of that of a second disparate system 42. In this regard, example embodiments may enable compatibility between at least two systems that operate independently from each other.

Without the benefit of example embodiments, tedious and specific implementations in subsequent application code may need to be implemented that successfully integrate an object in one system to the object type of another system. Each time a new version of an application is released, compatibility with all prior versions would have to be considered and individually implemented by application developers. Such an approach would require extensive programming, as well as memory to store the additional program code. The object definition differences between different versioned applications would need to be continually addressed in every new application and new version of an application to be released. Example embodiments, however, provide a programmatic solution that will enable data compatibility in the future, regardless of different data formats implemented on disparate systems. In this regard, example embodiments further provide conservation of memory resources to store additional programming code, and conservation of processing resources otherwise needed to process the additional code.

It will be appreciated that the figures are each provided as examples and should not be construed to narrow the scope or spirit of the disclosure in any way. In this regard, the scope of the disclosure encompasses many potential embodiments in addition to those illustrated and described herein. Numerous other configurations may also be used to implement embodiments of the present invention.

FIGS. 3 and 6 illustrate operations of a method, apparatus, and computer program product according to some example embodiments. It will be understood that each operation of the flowcharts or diagrams, and combinations of operations in the flowcharts or diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory 214) storing instructions executable by a processor in the computing device (for example, by processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, apparatus 200) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, apparatus 200 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving an object graph comprising a first plurality of objects;
   serializing the object graph to generate a map tree comprising a plurality of maps, wherein each map of the plurality of maps comprises dyads of first and second elements, and wherein the dyads of the first and second elements representing primitive fields are populated as name-value pairs and the dyads of the first and second elements representing non-primitive fields are populated as name-map pairs;
   causing transmission of the map tree to a disparate system; and
   de-serializing the map tree to populate a second plurality of objects compatible with the disparate system, wherein de-serializing the map tree comprises preventing de-serialization of at least one particular map of the map tree in an instance a particular name associated with the at least one particular map of the map tree does not match any class available to the disparate system.

2. The method of claim 1, wherein each map of the plurality of maps comprises a class-specifying dyad of a predefined string and a class identifier to identify the class which the respective map represents.

3. The method of claim 2, wherein de-serializing a particular map of the map tree comprises:
   identifying a class-specifying dyad having a first element matching the predefined string;
   in an instance a second element of the class-specifying dyad matches a class available to the disparate system, creating an object of a type specified by the class identifier and continuing de-serialization of the particular map of the map tree; and
   in an instance the second element of the class-specifying dyad does not match any class available to the disparate system, discontinuing de-serialization of the particular map of the map tree.

4. The method of claim 3, wherein continuing the de-serialization of the particular map of the map tree comprises:
   recursively processing each dyad of the particular map of the map tree until the particular map of the map tree is processed comprises only the class-specifying dyad and the name-value pairs representing primitive fields.

5. The method of claim 4, wherein recursively processing each dyad of the particular map of the map tree comprises:
   determining whether a field matching a first element of a particular dyad exists in an associated class of the disparate system;
   in an instance the field matching the first element of the particular dyad exists in the associated class of the disparate system, processing a second element of the particular dyad; and
   in an instance the field matching the first element of the particular dyad does not exist in the associated class of the disparate system, preventing processing of the second element of the particular dyad.

6. The method of claim 5, wherein processing the second element of the particular dyad comprises:
   in an instance the second element of the particular dyad is a nested map, de-serializing the nested map; and
   in an instance the second element of the particular dyad is not a nested map, populating a field of an associated object with a value of the second element of the particular dyad.

7. A system comprising:
   (a) a first apparatus comprising at least a first processor and at least one memory storing computer program code, the at least one memory and the computer program code configured to, with the at least the first processor, cause the first apparatus to at least:
   receive an object graph comprising a first plurality of objects;
   serialize the object graph to generate a map tree comprising a plurality of maps, wherein each map of the plurality of maps comprises dyads of first and second elements, and wherein the dyads of the first and second elements representing primitive fields are populated as name-value pairs and the dyads of the first and second elements representing non-primitive fields are populated as name-map pairs; and
   cause transmission of the map tree to a second apparatus; and (b) the second apparatus, wherein the second apparatus is configured by at least a second processor to cause the second apparatus to at least:

de-serialize the map tree to populate a second plurality of objects compatible with the second apparatus, wherein de-serializing the map tree comprises preventing de-serialization of at least one particular map of the map tree in an instance a particular name associated with the at least one particular map of the map tree does not match any class available to the disparate system.

8. The system of claim 7, wherein each map of the plurality of maps comprises a class-specifying dyad of a predefined string and a class identifier to identify the class which the respective map represents.

9. The system of claim 8, wherein de-serializing a particular map of the map tree comprises:
identifying a class-specifying dyad having a first element matching the predefined string;
in an instance a second element of the class-specifying dyad matches a class available to the second apparatus, creating an object of a type specified by the class identifier and continuing de-serialization of the particular map of the map tree; and
in an instance the second element of the class-specifying dyad does not match any class available to the second apparatus, discontinuing de-serialization of the particular map of the map tree.

10. The system of claim 9, wherein continuing the de-serialization of the particular map of the map tree comprises:
recursively processing each dyad of the particular map of the map tree until the particular map of the map tree is processed comprises only the class-specifying dyad and the name-value pairs representing primitive fields.

11. The system of claim 10, wherein recursively processing each dyad of the particular map of the map tree comprises:
determining whether a field matching a first element of a particular dyad exists in an associated class of the second apparatus;
in an instance the field matching the first element of the particular dyad exists in the associated class of the second apparatus, processing a second element of the particular dyad; and
in an instance the field matching the first element of the particular dyad does not exist in the associated class of the second apparatus, preventing processing of the second element of the particular dyad.

12. The system of claim 11, wherein processing the second element of the particular dyad comprises:
in an instance the second element of the particular dyad is a nested map, de-serializing the nested map; and
in an instance the second element of the particular dyad is not a nested map, populating a field of an associated object with a value of the second element of the particular dyad.

13. A computer program product comprising at least one non-transitory computer-readable storage medium having computer-executable program code instructions stored therein, the computer-executable program code instructions comprising program code instructions to:
receive an object graph comprising a first plurality of objects;
serialize the object graph to generate a map tree comprising a plurality of maps, wherein each map of the plurality of maps comprises dyads of first and second elements, and wherein the dyads of the first and second elements representing primitive fields are populated as name-value pairs and the dyads of the first and second elements representing non-primitive fields are populated as name-map pairs;
cause transmission of the map tree to a disparate system; and
de-serialize the map tree to populate a second plurality of objects compatible with the disparate system, wherein de-serializing the map tree comprises preventing de-serialization of at least one particular map of the map tree in an instance a particular name associated with the at least one particular map of the map tree does not match any class available to the disparate system.

14. The computer program product of claim 13, wherein each map of the plurality of maps comprises a class-specifying dyad of a predefined string and a class identifier to identify the class which the respective map represents.

15. The computer program product of claim 14, wherein de-serializing a particular map of the map tree comprises:
identifying a class-specifying dyad having a first element matching the predefined string;
in an instance a second element of the class-specifying dyad matches a class available to the disparate system, creating an object of a type specified by the class identifier and continuing de-serialization of the particular map of the map tree; and
in an instance the second element of the class-specifying dyad does not match any class available to the disparate system, discontinuing de-serialization of the particular map of the map tree.

16. The computer program product of claim 15, wherein continuing the de-serialization of the particular map of the map tree comprises:
recursively processing each dyad of the particular map of the map tree until the particular map of the map tree is processed comprises only the class-specifying dyad and the name-value pairs representing primitive fields.

17. The computer program product of claim 16, wherein recursively processing each dyad of the particular map of the map tree comprises:
determining whether a field matching a first element of a particular dyad exists in an associated class of the disparate system;
in an instance the field matching the first element of the particular dyad exists in the associated class of the disparate system, processing a second element of the particular dyad; and
in an instance the field matching the first element of the particular dyad does not exist in the associated class of the disparate system, preventing processing of the second element of the particular dyad.

18. The computer program product of claim 17, wherein processing the second element of the particular dyad comprises:
in an instance the second element of the particular dyad is a nested map, de-serializing the nested map; and
in an instance the second element of the particular dyad is not a nested map, populating a field of an associated object with a value of the second element of the particular dyad.

* * * * *